Aug. 22, 1961     H. SHECHTER ET AL     2,997,504
POLYNITRATED COMPOUNDS AND PROCESSES OF MAKING THEM Filed April 2, 1951

INVENTORS
HAROLD SHECHTER
BY RALPH R. KAPLAN

Jerome R. Cox
ATTORNEY

2,997,504
POLYNITRATED COMPOUNDS AND PROCESSES OF MAKING THEM

Harold Shechter and Ralph B. Kaplan, Columbus, Ohio, assignors to The Ohio State University Research Foundation, Columbus, Ohio, a corporation of Ohio
Filed Apr. 2, 1951, Ser. No. 220,380
26 Claims. (Cl. 260—635)

This application discloses new processes for the formation of polynitro compounds.

Heretofore, some polynitro compounds have been prepared in various ways. We have discovered, however, new ways by which such prior polynitro compounds may be prepared.

One of the objects of this invention therefore is the provision of new methods for the formation of polynitro compounds.

A further object of the invention is the conversion of organic nitro compounds having one or more mononitro groups into polynitro compounds have dinitro group or groups and the conversion of polynitrated compounds into polynitrated compounds having greater nitration.

A further object of our invention is the provision of more efficient methods for the production of polynitro compounds by initially forming a polynitroalcohol including the desired product by our novel process and subsequently removing an aldehyde or ketone to secure the desired product.

A feature of the invention is the formation of polynitro compounds by the nitration of mono and polynitro compounds by the reaction thereof with nitrite ions in the presence of silver or mercuric ions.

A further feature of the invention comprises the mixing of mononitro and polynitro compounds with a source of nitrite ions and the subsequent addition of a source of silver, or mercuric ions to yield higher polynitrated compounds.

A further feature of the invention is the utilization of nitrite ions autogenerated in nitro compounds for increased nitration therein.

Further objects and features of the invention will be apparent from a reading of the subjoined specification and claims and the consideration of the accompanying drawings illustrating our invention.

In the drawings the figure illustrates two embodiments of the new processes which we have developed.

Figure 1:
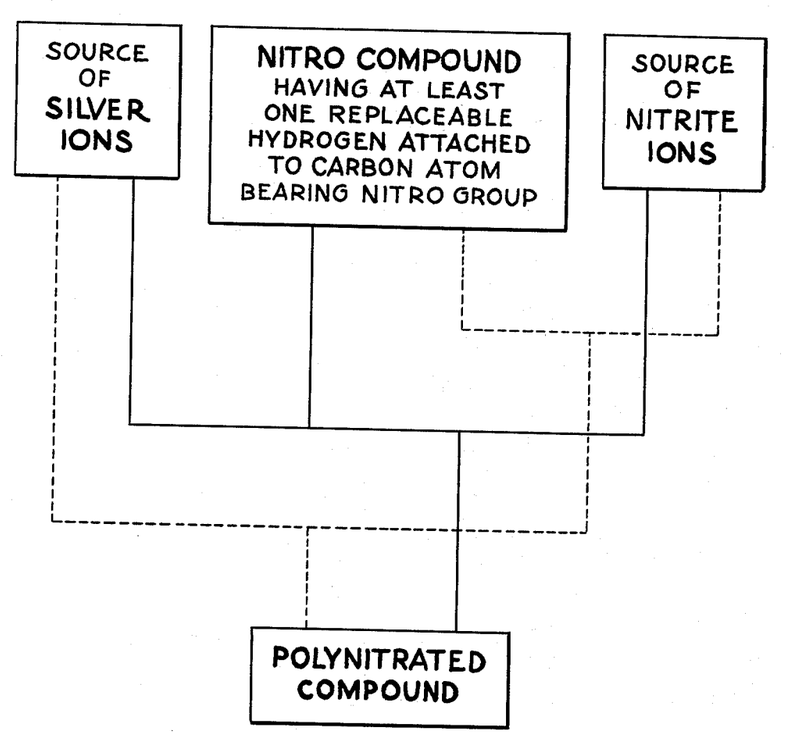

Referring therefore to the drawings, it may be seen that we show as an illustration of our invention that we can react an organic nitro compound having at least one replaceable hydrogen attached to the carbon atom bearing the nitro group with any source of nitrite ions and with a source of silver ions or that we can initially react such a nitro compound with a source of nitrite ions and then react the product with a source of silver ions to produce a polynitrated compound. In place of a source of silver ions, we may instead use a source of mercuric ions if it seems desirable. The overall-equations involved are illustrated by:

(1)

(2)

In the above equations R and R' may equal hydrogen, and alkyl grouping or cycloalkyl, aryl, functionally substituted cycloalkyl, or functionally substituted alkyl or aryl groupings. M is a metallic cation such as any of the light metals (preferably alkali metals since their salts are usually more soluble) as for example sodium, potassium, lithium, calcium, magnesium, etc. M' is also a metal cation such as for example sodium, potassium, lithium, calcium, magnesium, etc., and may also be ammonium. A is any anion which forms a soluble silver salt such as a nitrate, nitrite or acetate. Nitrite ions ($NO_2$) may be any source of nitrite such as an organic nitrite; nitric oxide and alkali; nitrogen oxide and alkali; inorganic nitrite; organic nitrate and alkali; and organic primary and secondary nitro compounds, alkali and nitric oxide. Ag represents the silver ion, but mercuric ions may be used instead of silver if desired.

The temperature and pressure are relatively unimportant. Any temperature between 0° C. and 100° C. is satisfactory. Atmospheric pressure is suitable. The solvent for the reaction may be any solvent which is substantially inert with regard to the reactants and in which the reactants are appreciably soluble. Water is preferable. The alcohols such as for example methyl, ethyl, ethylene glycol, etc. are satisfactory. Other solvents may also be used provided they are inert to the reactants.

The first reactant used may be, as suggested above, any nitro compound having at least one replaceable hydrogen attached to the carbon atom bearing the nitro group. These are known as primary and secondary nitro compounds and include substances such as phenylnitromethane, and 9-nitrofluorene in addition to nitromethane, 2-nitropropane and their homologs and also the substituted nitroalkanes such as nitro alcohols, nitro acids, nitro aldehydes, nitro ketones, etc.

The source of nitrite ions is any inorganic nitrite capable of furnishing nitrite ions (e.g. $KNO_2$, $NaNO_2$, $LiNO_2$ $NH_4NO_2$, $AgNO_2$); any source of nitrite ions resulting from such reactions as organic nitrate and alkali, nitrogen oxides in alkali, nitroalkanes (primary and secondary) in alkali, and nitric oxide and alkali.

The source of silver or mercuric ions may be any source thereof. However, we have worked mainly with silver salts such as silver nitrate, silver nitrite and silver acetate. The nitro compound reacts with the nitrite ions in the presence of the silver ions to add another nitrite to mononitrated carbon to attach a second nitro radical thereto. Two silver ions are required for each nitrite ion and every molecule of nitro compound. Moreover, primary and secondary nitro compounds in alkaline solutions yield nitrite ions on standing and such solutions can then be treated with silver ions to give the desired reactions to yield dinitro compounds.

It is known that certain nitro compounds (primary and secondary) may be converted to salts by the addition of bases such as alkali and alkaline earth hydroxides, carbonates, alkoxides, etc. Primary and secondary nitro compounds have a hydrogen atom on the carbon atom containing the nitro group. Such primary and secondary nitro compounds are the ones which form salts when reacted with alkali. Tertiary nitro compounds do not form salts and there is no reaction of tertiary nitro compounds comparable to that disclosed herein. Our reaction also will work only for primary and secondary nitro compounds.

The reaction conditions are as stated above but also include the condition that the reactants must be dissolved in neutral or alkaline medium. Water is preferable. Alcohols such as methanol, ethanol, and ethylene glycol are satisfactory. Any basic hydroxide or alcoholate may be used, as for example, sodium hydroxide, sodium ethylate, either in aqueous or alcoholic solution.

As we have said above we have discovered that mixtures of aliphatic nitro compounds and nitrite ions in the presence of some oxidizing agents, such as silver nitrate, yield corresponding dinitro aliphatic compounds in which the nitro groups are attached to the same carbon atom. We can react a dinitro compound where the nitro groups are attached to different carbon atoms to produce a trinitrated compound or a tetranitrated compound, etc., wherein the incoming nitrite ions are attached to the carbon atoms which already had the nitro group or groups attached. Other more highly polynitrated compounds may be reacted to increase the number of nitro groups attached to the compound.

Oxidizing agents such as hypobromite, permanganate, persulfate, and ferric ions do not effect this transformation. The choice of oxidizing agents is also affected by the requirement that the reaction proceeds only in alkaline and neutral media; inasmuch as under acidic conditions the formation of pseudonitroles occurs rapidly.

We have also found that the salts of secondary nitroalkanes and alicylic nitro compounds react with nitric oxide to form products from which the gem-dinitro compound may be obtained by reaction with silver ion. The salt obtained from nitric oxide and sodium 2-nitrobutane indicates that product has an empirical formula of $$C_4H_8O_4N_2Na_2$$

It is evident that the chemical behavior of the secondary salts obtained by the reaction of nitric oxide and salts of secondary nitroalkanes is identical with that of an equal molar mixture of sodium nitro compounds and sodium nitrite. As shown by experiment in the nitric oxide reactions the nitrite ion is formed at the expense of the anions of the secondary nitro compound; the theoretical yield of mixed salt by this reaction is 50 mole percent. The salts of the nitro compound and nitrite coprecipitate from the homogeneous alcoholic solution on introducing nitric oxide. The yields of double salt are 90 to 95% of theory. In a single experiment sodium nitrocyclohexane reacted in a large excess of nitric oxide to yield, in addition to a double salt of sodium nitrocyclohexane and sodium nitrite, cyclohexanone, cyclohexanone oxime, and 1,1'-dinitro-bicyclohexyl.

Our preferred method is to react the nitro compound with nitrite ions in the presence of silver ions. We have thus prepared 1,1-dinitroethane; 1,1-dinitropropane; 2,2-dinitropropane; 2,2-dinitrobutane; 1,1-dinitrocyclohexane; 2,2,4,4-tetranitropentane; 2,2-dimethyl-1,1,3-trinitropropane; 2,2-dinitro-1,3-propanediol; 2,2-dinitro-1-propanol; and 1,1-dinitro-2-propanol in yields of from 70 to 92%. Potassium dinitromethane; 9,9-dinitrofluorene; phenyldinitromethane; and 3,3-dinitro-2-butanol were obtained in somewhat lower yields.

Dinitromethane as the potassium salt was produced in relatively small yields from the reaction of nitromethane, alkali, and sources of silver and nitrite ions. Alternate, more efficient procedures were developed based on the general reactions that we have discovered in which 2-nitro-1,3-propanediol and 1-nitro-2-propanol are converted as described and as indicated in the following Equations 3 and 4 and 5 and 6, respectively, into 2,2-dinitro-1,3-propanediol and 1,1-dinitro-2-propanol, respectively.

(3) $HOCH_2—CH(NO_2)CH_2OH+C_2H_5ONa$
$\rightarrow HOCH_2—C(=NO_2Na)—CH_2OH+C_2H_5OH$ (4) $HOCH_2—C(=NO_2Na)—CH_2OH$
$+NaNO_2+2AgNO_3 \rightarrow HOCH_2—C(NO_2)_2$
$—CH_2OH+2Ag+2NaNO_3$ (5) $CH_3—CHOH—CH_2NO_2+C_2H_5ONa$
$\rightarrow CH_3—CHOH—CH=NO_2Na+C_2H—OH$ (6) $CH_3—CHOH—CH=NO_2Na+NaNO_2+2AgNO_3$
$\rightarrow CH_3—CHOH—CH(NO_2)_2+2NaNO_3+2Ag$ We have discovered that functionally substituted gem-dinitro compounds may be prepared from functionally substituted primary or secondary nitro compounds. Examples thereof are 2,2-dinitro-1,3-propanediol and 1,1-dinitro-2-propanol. They may be prepared in excellent yields. Gem-dinitro compounds which contain hydroxyl groupings on the carbon atom, adjacent to the gem-dinitro carbon structure (alpha gem dinitroalcohols), may be converted (e.g. hydrolyzed) into the corresponding primary gem-dinitro compound and the corresponding carbonyl compound. For example, 2,2-dinitro-1,3-propanediol may be split into 2,2-dinitroethanol and formaldehyde. Similar reaction of 2,2-dinitroethanol yields dinitromethane and formaldehyde. Such reaction is usually best conducted in an alkaline medium and the dinitro compounds are usually isolated most conveniently as their salts. The following Equations 7 and 8 illustrate the above:

(7) $HOCH_2—C(NO_2)_2CH_2OH+KOH$
$\rightarrow HOCH_2—C(NO_2)_2K+CH_2=O+H_2O$ (8) $HOCH_2—C(NO_2)_2K \rightarrow CH(NO_2)_2K+CH_2=O$ Similarly 1,1-dinitro-2-propanol is hydrolyzed in nearly quantitative yields to dinitromethane and acetaldehyde. Dinitromethane is best isolated as one of its salts. The following Equation 9 illustrates.

(9) $CH_3—CHOH—CH(NO_2)_2+KOH$
$\rightarrow CH_3—CH=O+CH(NO_2)_2K+H_2O$

Similarly 2-nitro-1-propanol and 3-nitro-2-butanol were converted by the procedures disclosed herein to 2,2-dinitro-1-propanol and to 3,3-dinitro-2-butanol, respectively. Hydrolytic decomposition of 2,2-dinitro-2-propanol yields 1,1-dinitroethane and formaldehyde efficiently. Hydrolytic decomposition of 3,3-dinitro-2-butanol yields 1,1-dinitroethane and formaldehyde efficiently.

It is apparent therefore that oxidative nitration of primary and secondary nitroalcohols to produce gem-dinitroalcohols followed by decomposition of the gem-dinitroalcohols is an excellent method for the preparation of gem-dinitro compounds. We have prepared many other polynitrated compounds in addition to those mentioned above and in addition to those detailed in the subsequent examples by our process, and many other polynitrated compounds which may be prepared by our process will naturally occur to those skilled in the art. For example the gem-dinitro compounds which may be prepared include polynitrocarboxylic acids, polynitroalkyl sulfonic acids, polynitroalcohols, polynitroaldehydes, polynitroketones, polynitroamines, and derivatives thereof. Other specific examples in addition to those previously mentioned which will naturally occur to those skilled in the art will probably include: 4,4-dinitrobutyronitrile; 4,4-dinitropimelic acid; 2,2,4,4-tetranitrobutane; 5,5-dinitro-2-hexanone; 4,4-dinitro-1-pentanol; 4,4-dinitrovaleronitrile; methyl 4,4-dinitropentanoate; methyl 4,4-dinitrobutyrate; methyl 3,3-dinitropropionate; 3,3-dinitro-1-propene, etc. It will also be apparent that this invention will be applicable to the treatment of mixtures of primary and secondary nitrohydrocarbons.

Following are some examples of the preparation of specific compounds through reactions performed according to our invention:

EXAMPLE I

Preparation of 1,1-dinitroethane; preparation of potassium 1,1-dinitroethane; and preparation of silver 1,1-dinitroethane.

(a) A solution of rectified nitroethane (15.0 g., 0.2 mole) and sodium nitrite (4.0 g., 97% assay) in aqueous sodium hydroxide (8.5 g., 80 ml.) was added as rapidly as possible to a stirred mixture of aqueous silver nitrate (70.5 g., 0.41 mole in 120 ml.) sodium hydroxide (2–3 drops until silver oxide appeared) and ether (150 ml.) at 0–5°. (The solution of nitroethane in alkali was effected below 20°.) A cream-colored solid of large volume formed immediately. The temperature of the mixture rose to 10°; when the solid began to decompose rapidly (with blackening, large reduction in volume) the temperature rose to 20°. After a few minutes, the temperature began to fall; the cooling bath was removed and the mixture was stirred for thirty minutes at 20°.

The silver deposit was filtered and washed with ether-benzene (9.5:1, 2 x 10 ml.). The ether layer of the filtrate, after being washed with saturated sodium chloride solution and filtered slowly through anhydrous sodium sulfate, yielded, on distillation, colorless 1,1-dinitroethane (18.9 g., 78%); B.P. 55.5–56° (4.25–4.5 mm.), $n_D^{20}$ 1.4341–1.4346; $d_4^{20}$ 1.355; $M_D$ calcd. 22.68, $M_D$ found 23.11; neut. equiv. calcd. 120, neut. equiv. found, 122.

(b) Reaction of 1,1-dinitroethane with methanolic potassium hydroxide yielded potassium 1,1-dinitroethane, a yellow salt, which when recrystallized from hot water as shining yellow plates melts at 155° (explodes). The derivative developed a characteristic red tinge when exposed to air and light.

*Analysis.*—Calcd. for $C_2H_3O_4N_2K$: K, 24.72. Found: K, 24.37, 24.41.

(c) An aqueous solution of potassium 1,1-dinitroethane (0.16 g., 0.001 mole in 4 ml.) was added to an aqueous silver nitrate solution (0.34 g., 0.002 mole, 100% excess, in 1 ml.) at 5–10°. Filtration of the mixture yielded bright yellow plates of silver 1,1-dinitroethane (0.23 g., 100%, washed with methanol and ether). The silver salt, stable at room temperatures, darkens progressively at temperatures above 120° and decomposes suddenly at 155°.

*Analysis.*—Calcd for $C_2H_3O_4N_2Ag$: Ag, 47.54. Found: Ag, 47.55.

EXAMPLE II

Preparation of 1,1-dinitropropane

A solution of 1-nitropropane (8.9 g., 0.1 mole) and sodium nitrite (7.1 g., 97% assay) in aqueous sodium hydroxide (4.2 g., 1.05 mole in 45 ml.) was added rapidly to a mixture of aqueous silver nitrate (34.0 g., 0.2 mole) and ether (150 ml.) at 0–5°. The procedure followed was identical with that described for the preparation of 1,1-dinitroethane in Example I. Distillation of the product yields 1,1-dinitropropane (10.8 g., 80%, no forerun or residue), B.P. 56–58° (4–4.5 mm.), $n_D^{20}$ 1.4340, $d_4^{20}$ 1.267; $M_D$ calcd. 27.30, $M_D$ found 27.55; neut. equiv. calcd. 134, neut. equiv. found 136. (The neutralization equivalent was determined by potentiometric titration of the product with standard alkali: when thymolphthalein (pH 9.3–10.5, colorless-blue) was used as indicator, values for the neutralization equivalent of 135 and 137 were obtained; however, the end point (green in this system) was difficult to see.)

EXAMPLE III

Preparation of 2,2-dinitropropane 2-nitropropane (8.9 g., 0.1 mole) and sodium nitrite (7.5 g., 97% assay, 0.11 mole) were dissolved in a slight excess of 10 percent aqueous sodium hydroxide (4.5 g., 0.11 mole in 45 ml.). Aqueous silver nitrate (34.0 g., 0.2 mole in 100 ml.) was then added dropwise to the stirred mixture. The light colored salt that formed initially turned black rapidly, evolving heat; during addition of the silver nitrate solution, the mixture was cooled periodically. The mixture on distillation (till two-phase droplets no longer appeared) yielded 2,2-dinitropropane (12.7 g., 92.7%), M.P. 48–50°. When recrystallized from petroleum ether, the dinitro compound melts at 53.5–54°.

EXAMPLE IV

Preparation of 2,2-dinitrobutane 2-nitrobutane (10.3 g., 0.1 mole) and sodium nitrite (7.5 g., 97% assay) were dissolved in aqueous sodium hydroxide (4.6 g., 0.115 mole in 45 ml.). Aqueous silver nitrate (34.0 g., 0.2 mole) was added dropwise to the stirred solution at 0–20°. After ten minutes the mixture was distilled. The two-phase distillate was extracted with ether. Distillation of the ether extract (dried with anhydrous calcium sulfate) yielded pure (there was no fore-run and no residue), colorless 2,2-dinitrobutane (12.0 g., 81%), B.P. 77.8–78° (10 mm.), $n_D^{20}$ 1.4353, $d_4^{20}$ 1.212; $M_D$ calcd. 31.92, $M_D$ found 31.90.

*Analysis.*—Calcd. for $C_4H_8O_4N_2$: C, 32.43; H, 5.44; N, 18.92. Found: C, 31.88; H, 5.37; N, 18.16.

EXAMPLE V

Preparation of 1,1-dinitrocyclohexane

Nitrocyclohexane (12.9 g., 0.1 mole) was refluxed for ten minutes with aqueous sodium hydroxide (6.5 g., 0.137 mole in 65 ml.) until the solution was homogeneous. The yellow solution was cooled to 0°, sodium nitrite (7.5 g., 97% assay) was added and the solution treated with aqueous silver nitrate (34.0 g., 0.2 mole in 80 ml.). On steam distillation of the aqueous mixture, a product was obtained first as a yellow insoluble liquid, then as a white, waxy solid (M.P. 33–35°). The distillate was extracted with ether. Distillation of the ether extract (dried with anhydrous sodium sulfate) yielded a colorless product (12.2 g., 70%), B.P. 65–67° (0.7 mm.), M.P. ca. 30°. When redistilled (B.P. 67.5–68° (0.75 mm.)) or recrystallized from petroleum ether, 1,1-dinitrocyclohexane melts at 35.5–36°.

*Analysis.*—Calcd. for $C_6H_{10}O_4N_2$: C, 41.38; H, 5.79; N, 16.09. Found: C, 41.23; H, 5.64; N, 15.85.

EXAMPLE VI

Preparation of 9,9-dinitrofluorene, 9,9'-dinitro-9,9'-bifluorene and fluorenone (a) Aqueous silver nitrate (6.8 g., 0.04 mole in 20 ml.) was poured into a stirred mixture of potassium 9-nitrofluorene (5.0 g., 0.02 mole), sodium nitrite (2.1 g., 97% assay, 0.03 mole), water (50 ml.) and benzene (50 ml.). A yellow solid formed which agglomerated immediately and turned red. In two hours the lumpy solid, while being vigorously stirred, darkened slowly, turning brown then black. After forty-eight hours at 25–30°, the mixture was filtered; the black residue was washed several times with hot benzene. The benzene extract was washed with a saturated sodium chloride solution and distilled in vacuo until a yellow solid crystallized. After petroleum ether (25 ml.) was added, filtration of the mixture yielded crude 9,9'-dinitro-9,9'-bifluorene (1.60 g., 76%), pink powder, M.P. 160–166°. After several recrystallizations from benzene-petroleum ether, white crystals of 9,9'-dinitro-9,9'-bifluorene were obtained, M.P. 180–1°, 183–183.5°; a small portion had a pale blue cast and melted at 182–183°. The melting point of the white solid was not depressed by addition of the blue product.

The benzene-petroleum ether filtrate was concentrated; upon addition of petroleum ether, a peach colored solid, crude 9,9-dinitrofluorene, precipitated (0.4 g., 7.8%). The amorphous solid began to decompose at 120° and finally melted with evolution of gas at 126°. After recrystallization from ether-petroleum ether, 9,9-dinitrofluorene, peach colored, melts with decomposition at 130–131.5°, 130–131°.

*Analysis.*—Calcd. for $C_{13}H_8O_4N_2$: N, 10.94. Found: N, 10.54.

The filtrate that remained after the 9,9-dinitrofluorene fraction had been isolated, was concentrated and, on cooling, a yellow solid separated, M.P. 70–75°. Recrystallization of this product from a mixture of ethanol and water yielded fluorenone (0.16 g., 4.1%), M.P. 82–83°. The ketone gave the characteristic violet color in concentrated sulfuric acid.

Evaporation of the mother liquors left a yellow oil which did not crystallize from mixtures of benzene, ether and petroleum ether. Two-thirds of this material, when treated with hydroxylamine yielded fluorenone oxime (0.08 g., 3.1%); after recrystallization from chloroform-petroleum ether, the oxime, yellow needles, melts at 193–194°; literature 193–194°.

EXAMPLE VII

*Preparation of phenyldinitromethane and 1,2-dinitro-1,2-diphenylethane*

Phenylnitromethane (6.85 g., 0.05 mole) and sodium nitrite (3.7 g., 0.05 mole, 97% assay) were dissolved in aqueous sodium hydroxide (2.1 g., 0.052 mole in 30 ml.). Ether (150 ml.) and benzene (30 ml.) were added and the mixture was cooled to 0°. Aqueous silver nitrate (17.0 g., 0.1 mole in 50 ml.) was added all at once and the grey pasty solid was vigorously stirred for four hours (up to 30°). The silver deposit was filtered and washed with hot benzene. After the organic layer in the filtrate had been separated, washed with brine and evaporated in vacuum, an oily solid (I) was obtained.

The aqueous layer in the filtrate was acidified with nitric acid and extracted with ether; evaporation of the ether left phenyldinitromethane as white needles. The product fumed off while being dried on a hot water bath, leaving 0.7 g. of a yellow liquid (discarded).

Crude product I was triturated with Skellysolve B (50 ml.), allowed to stand at 0–10° for sixteen hours, then filtered to yield II (3.10 g.), M.P. 72–118°. Evaporation of the filtrate gave an oil that did not crystallize from mixtures of benzene-petroleum ether and ether-petroleum ether. An ether solution of the oil was extracted repeatedly with small portions of aqueous sodium hydroxide (5%) until a yellow color no longer developed in the alkaline layer. After acidification of the alkaline extract with hydrochloric acid (2 N) at 0°, white needles of phenyldinitromethane (0.25 g.), M.P. 78–80° precipitated; M.P. 79–80° after recrystallization from Skellysolve B.

The organic layer remaining after extraction with alkali was dried and evaporated in vacuum, leaving a yellow liquid. The product was identified as crude benzaldehyde (1.9 g., 36%) by conversion into benzaldehyde phenylhydrazone, M.P. 156–157° (from methanol-ethanol) in 60 percent yield (22% from phenylnitromethane).

Solid II (3.10 g., M.P. 72–118°) was fractionally crystallized from benzene-Skellysolve B to yield several fractions which were mixtures of alpha and beta-1,2-dinitro-1,2-diphenylethane (1.63 g.), M.P. 144–146°, 144–148°. On recrystallization of the mixture from ethanol, alpha-1,2-dinitro-1,2-diphenylethane (0.40 g.), white crystals, M.P. 233–234° (decomposition), and beta-1,2-dinitro-1,2-diphenylethane, several fractions melting between 144 and 150°, were obtained. The beta product after recrystallization several times from ethanol, yielded white crystals melting at 149–150°. The recorded (highest) melting points of the alpha and beta forms are 234–236° and 154–155°, respectively. Infrared spectrograms of the two forms of 1,2-dinitro-1,2-diphenylethane (0.2 M in sym-tetrachlorethane; Baird recording spectrophotometer) were identical. Beta-1,2-dinitro-1,2-diphenylethane, M.P. 146–148°, was converted into 3,4,5-triphenylisoxazole, M.P. 210.5–211°, when heated with 1:1 potassium hydroxide for four hours on a steam bath; lit. M.P. 212°, 213–214°, 214–215°.

Ether solutions of the low melting fractions (M.P. 64–68°, 69–95°) from solid II were extracted with dilute alkali; acidification of the alkaline extracts yielded phenyldinitromethane (0.85 g., total), M.P. 79–80°. The remaining product which was insolube in cold dilute alkali yielded beta-1,2-dinitro-1,2-diphenylethane and crude trans-7-nitrostilbene (0.21 g.), M.P. 123–124° (from petroleum ether); lit. M.P. 128°.

A total yield of 1,2-dinitro-1,2-diphenylethane of 2.53 g. (37.2%) was obtained. Pure phenyldinitromethane (1.1 g.) was obtained in 12.1 percent yield; the total yield was 19 percent.

EXAMPLE VIII

*Preparation of 2,2-dimethyl-1,1,3-trinitropropane*

(a) *Formation of the intermediate disodium salt of 2,2-dimethyl-1,3-dinitropropane.*—2,2-dimethyl - 1,3 - dinitropropane (4.2 g., 0.025 mole) in absolute ethyl alcohol (50 ml.) was added at 0° to a stirred solution of sodium (1.3 g., 0.06 mole) in alcohol (50 ml.). The jelled white mass was filtered; the product was washed with a little alcohol and then liberally with ether. After being dried in vacuo in a desiccator, the white, powdery disodium dinitroneopentane weighed 6.1 g. (theoretical, 5.4 g.). A portion (0.1 g.) was dried over phosphoric anhydride (2 hours at 2 mm.) and analyzed for sodium (as sodium sulfate).

*Analysis.*—Calcd. for $C_5H_9O_4N_2Na$: Na, 12.49. Calcd. for $C_5H_8O_4N_2Na_2$: Na, 22.31. Calcd. for $C_5H_8O_4N_2Na$—$C_2H_5OH$: Na, 18.30. Found: Na, 17.7.

(b) *Nitration of the intermediate salt to 2,2-dimethyl-1,1,3-trinitropropane.*—The salt prepared from dinitroneopentane was dissolved, in portions, in ice water (50 ml.); sodium nitrate (5.0 g., 97% assay, 0.07 mole) was added, and the cold solution was poured rapidly into a stirred mixture of aqueous silver nitrate (18.5 g., 0.11 mole in 50 ml.) and methylene chloride (100 ml.). After one hour the mixture was filtered; the silver residue was washed with methylene chloride. Evaporation of the organic layer from the filtrate left a yellow waxy solid (3.4 g.) which, when triturated with cold Skellysolve F (25 ml.) and filtered, yielded 2,2-dimethyl-1,1,3-trinitropropane (3.2 g., 61% crude), M.P. 106–109°. Purification of the trinitroneopentane by fractional crystallization from ether-petroleum ether gave a white product, M.P. 122.5–123°, which was soluble in ether, methanol, chloroform, benzene and aqueous alkali (deep yellow solution) and insoluble in water and cold petroleum ether. The melting points (between 114 and 122°) of less pure fractions were not depressed when pure 2,2-dimethyl - 1,1,3 - trinitropropane was added in varying amounts. The probable contaminant, 2,3-dimethyl-1,3-dinitropropane (M.P. 93°) could not be easily eliminated by fractional crystallization. However, when the crude material was treated with 0.5 N sodium hydroxide for ten minutes and the solution filtered and reacidified at 0°, 2,2-dimethyl-1,1,3-trinitropropane was regenerated; recrystallized from ether-petroleum ether, M.P. 121–122°, or sublimed at 60–70° (5 mm.), M.P. 121–122°.

The neutralization equivalent, 207, of 2,2-dimethyl-1,1,3-trinitropropane (M.P. 122–123°) agreed with the theoretical value, 207, for the monobasic acid (titrated potentiometrically with standard alkali).

*Analysis.*—Calcd. for $C_5H_9O_5N_3$: C, 29.00; H, 4.38; N, 20.29. Found: C, 30.37; H, 4.21; N, 1905.

EXAMPLE IX

*Preparation of 2,2-dinitro-1-propanol*

(a) *Sodium salt of 2-nitro-1-propanol.*—A solution of 2-nitro-1-propanol (10.5 g., 0.1 mole) in ether (25 ml.) was added dropwise at 0° to a stirred solution of sodium (2.3 g., 0.1 gram atom) in absolute ethanol (50 ml.). Ether (25 ml.) was added and, after one-half hour, the mixture was filtered. White, powdery sodium 2-nitro-1-propanol (12.2–12.7 g., 96–100%) was obtained after the solid had been washed and stored for twenty-four hours over anhydrous calcium chloride.

(b) *Nitration of the salt to 2,2-dinitro-1-propanol.*—Sodium 2-nitro-1-propanol (6.0 g., 0.048 mole) and sodium nitrite (4.0 g., 97% assay) were dissolved in water (30 ml.). Aqueous silver nitrate (17.0 g., 0.1 mole in 50 ml.) was added (all at once) at 0°, and the cream-colored solid that formed was shaken (or stirred) for two to three minutes until it had deposited metallic silver. After fifteen minutes, the reaction mixture was filtered; the black residue was washed with hot water (3 x 10 ml.) and ether (50 ml.). The aqueous filtrate and washings were extracted with ether-benzene (9:1, 4 x 60 ml.); the combined extracts were washed with saturated sodium chloride solution and concentrated to approximately 30 ml. by distillation. On slowly adding the cooled concentrate to Skellysolve F (150 ml.) at 0–5°, 2,2-dinitro-1-propanol separated as a white, waxy solid. Additional product was obtained by concentrating the mother liquor and adding Skellysolve F. The crude product, obtained (thrice) in yields of 70–85 percent, melted at 89–90° (after twenty-four hours over phosphoric anhydride); recrystallization from petroleum ether-benzene did not alter its melting point.

*Analysis.*—Calcd. for $C_3H_6O_5N_2$: C, 24.00; H, 4.03; N, 18.67. Found: C, 24.14, 24.14; H, 3.74, 3.73; N, 17.85, 17.81.

2,2-dinitro-1-propanol behaved as a monobasic acid when titrated (potentiometrically) with standard alkali; neut. equiv. calcd. 150, neut. equiv. found 152. The end point (pH 10) was not as sharp as those observed for 1,1-dinitroethane, 1,1-dinitropropane, 3,3-dinitro-2-butanol and 2,2-dinitro-1,3-propanediol.

(c) *Potassium dinitroethane.*—When a methanolic solution of 2,2-dinitro-1-propanol was added to methanolic potassium hydroxide, potassium 1,1-dinitroethane, M.P. 150° (explodes), precipitated immediately in quantitative yield.

EXAMPLE X

*Preparation of 3,3-dinitro-2-butanol*

(a) *Salt product from 3-nitro-2-butanol.*—An ether solution of 3-nitro-2-butanol (11.9 g., 0.10 mole in 50 ml.) was slowly added to a stirred solution of sodium (2.3 g., 0.1 mole) in absolute ethanol (50 ml.) at 0°. After addition was completed and the mixture filtered the yellow salt (11.2 g., 80%) was washed with ether and stored over anhydrous calcium chloride.

(b) *Conversion of the intermediate salt into 3,3-dinitro-2-butanol and 1,1-dinitroethane.*—The sodium derivative of 3-nitro-2-butanol (11.2 g.) and potassium nitrite (7.0 g., 91% assay, 0.08 mole) was dissolved in water (40 ml.) at 0–5°. Aqueous silver nitrate (27.5 g., 1.62 mole in 80 ml.) was added rapidly; a cream colored solid was formed that darkened rapidly. The temperature was kept below 20° for fifteen minutes and then allowed to rise to 25°. The silver deposit was filtered and washed with ether; the aqueous filtrate was extracted with ether. Distillation of the combined and dried ether extracts yielded the following colorless liquid fractions: (1) B.P. 38–46°/2 mm., 3.6 g., $n_D^{20}$ 1.4379; (2) B.P. 48–60°/2 mm., 1.8 g., $n_D^{20}$ 1.4358; (2) B.P. 73–75°/2 mm., 2.1 g., $n_D^{20}$ 1.4586–1.4590, $d_4^{20}$ 1.332. Fraction (3) was identified as 3,3-dinitro-2-butanol (yield, 13% from 3-nitro-2-butanol): $M_D$ calcd., 33.44; $M_D$ found, 33.69. Methanolic potassium hydroxide converts 3,3-dinitro-2-butanol into potassium 1,1-dinitroethane, explodes 156°, in quantitative yield.

*Analysis.*—Calcd. for $C_4H_8O_5N_2$: C, 29.27; H, 4.91; N, 17.07; neut. equiv. (monobasic acid), 164. Found: C, 29.10; H, 4.25; N, 1702; neut. equiv., 168.

Fractions (1) and (2), a mixture of 1,1-dinitroethane and 3,3-dinitro-2-butanol, were redistilled to give 1,1-dinitroethane, B.P 57–58° (5 mm.), $n_D^{20}$ 1.4352, identified as potassium 1,1-dinitroethane (explodes 156°). The yield of 1,1-dinitroethane was 40%. In other attempts, using the procedure described for preparations of 1,1-dinitroethane and 1,1-dinitropropane, the yield of 3,3-dinitro-2-butanol was not improved; however, 1,1-dinitroethane was obtained in yields of 65 percent from 3-nitro-2-butanol.

EXAMPLE XI

*Preparation of 2,2-dinitro-1,3-propanediol*

(a) Sodium 2-nitro-1,3-propanediol (94–97% yield) was prepared by the reaction of nitromethane, paraformaldehyde and sodium methoxide in methanol. The dried product contains two molecules of methanol of crystallization.

(b) *2,2-dinitro-1,3-propanediol.* Aqueous silver nitrate (17.0 g., 0.10 mole in 50 ml.) was added all at once to a solution of sodium 2-nitro-1,3-propanediol (7.2 g., 0.035 mole) and sodium nitrite (4.0 g., 97% assay, 0.056 mole) in water (40 ml.). The reaction flask was swirled vigorously in an ice bath so that the temperature did not exceed 30°. After thirty minutes at 25–30° the mixture was filtered and the silver deposit was washed with hot water (3 x 10 ml.). The combined filtrate and washings was extracted with ether (6 x 50 ml.); benzene (30 to 40 ml.) was added to the ether extract and the mixture was distilled at atmospheric pressure; ether, benzene-water azeotrope, and benzene were removed until crystallization occurred. The product was cooled, filtered, and washed with chloroform. Approximately 4.0 g. (average yield) of 2,2-dinitro-1,3-propanediol was obtained, white needles, M.P. 134–137°; a second crop of crystals weighed 0.3 g., yellow solid, M.P. 110–116°. Yield of crude product: 72–75 percent. When recrystallized from hot benzene and dried over phosphoric anhydride, 2,2-dinitro-1,3-propanediol melts at 139–140°. Yield: 70 percent.

*Analysis.*—Calcd. for $C_3H_6O_6N_2$: C, 21.69; H, 3.64; N, 16.87; neut. equiv. (monobasic acid), 166. Found: C, 21.93; H, 3.64; N, 16.12; neut. equiv., 168.

2,2-dinitro-1,3-propanediol was further characterized by conversion into potassium 2,2-dinitroethanol in quantitative yield (see below).

(c) *Preparation of potassium 2,2-dinitroethanol.*—2,2-dinitro-1,3-propanediol (1.66 g., 0.010 mole) in methanol (15 ml.) was added dropwise at 0–5° to a solution of potassium hydroxide (0.75 g., 85% assay, 0.011 mole) in water (5 ml.) and methanol (20 ml.). On filtering and washing the yellow crystals with methanol and ether, potassium 2,2-dinitroethanol (1.73–1.74 g., 99–100%) was obtained; decomposition range 130–230°.

*Analysis.*—Calcd. for $C_2H_3O_5N_2K$: C, 13.79; H, 1.74; N, 16.09. Found: C, 13.57; H, 1.56; N. 15.96.

Ultraviolet absorption spectrograms (Beckmann model DU quartz spectrophotometer, 1 cm. cell) of aqueous solutions of potassium 2,2-dinitroethanol ($10^{-4}$, $4 \times 10^{-5}$ molar) show a band peak at 365 mu, log $E$ max. 4.28; a minimum at 295 mu, log $E$ min. 3.00; and a band at 229 mu, log $E$ max. 3.81. The solubility of potassium 2,2-dinitroethanol in water at 20–25° is 0.1 g., in 0.8 ml. When treated with aqueous silver nitrate in concentrated aqueous solutions, potassium 2,2-dinitroethanol did not yield a water insoluble silver salt; the mixtures deposited a silver mirror, slowly at 25° and rapidly when warmed.

EXAMPLE XII

*Preparation of potassium dinitromethane from 1-nitro-2-propanol*

(a) *Sodium derivative of 1-nitro-2-propanol.*—An ether solution of 1-nitro-2-propanol (10.5 g., 0.10 mole in 40 ml.) was added to a stirred solution of sodium (2.3 g., 0.1 mole) in alcohol (50 ml.) at 0°. The product was filtered, washed with ether, air dried (15.0 g.; theoretical, 12.7), and immediately used for nitration.

(b) *Conversion of the intermediate salt into 1,1-dinitro-2-propanol (crude).*—The sodium salt was dissolved in ice water (75 ml.), and sodium nitrite (7.5 g., 97% assay, 0.11 mole) was added. The solution was poured into a stirred mixture of aqueous silver nitrate (34.0 g., 0.20 mole in 75 ml.) and ether (100 ml.) at 0°. After five minutes the cooling bath was removed; stirring was continued for one half hour. The mixture was filtered and the silver deposit was washed with ether. Saturated sodium chloride solution (a few milliliters) was added to the combined filtrate and washings, and the suspension was filtered free of silver chloride. The ether layer was separated, and the aqueous layer was extracted with ether (4 x 60 ml.). The combined ether extracts were washed with a saturated sodium chloride solution (2 x 10 ml.) and slowly filtered through anhydrous sodium sulfate. After ether had been removed under vacuum, a mobile yellow liquid (approx. 15 g.; theoretical, 15.0 g.) of disagreeabdle odor remained. The crude product slowly decomposed at 25°, evolving heat and gas; decomposition was arrested (i.e. no gas evolution) at 0° or in cold ether solution. The ether solution, after several days at 0–10°, served as a source for the preparation of potassium dinitromethane if adequate precautions were taken (see below).

1,1-dinitro-2-propanol, prepared from potassium dinitrimethane and acetaldehyde is reported to have the constants, $n_D^{20}$ 1.449, $d_4^{15}$ 1.33. An attempt to distill a portion of the crude oxidation product was unsuccessful; decomposition occurred even at low pressures (3–4 mm.), and, although about 30 percent was collected as distillate (74–90°/3–4 mm.), the product was unstable and decomposed in a short time with evolution of gas and heat. If the crude oxidation product is not distilled but stored in vacuum in order to remove solvent, it has a refractive index of $n_D^{20}$ 1.452.

(c) *Cleavage of 1,1-dinitro-2-propanol.*—Potassium dinitromethane and silver dinitromethane.—(1) The freshly prepared nitration product (1.50 g., 0.01 mole based on 1,1-dinitro-2-propanol) in methanol (5 ml.) was added at 0–5° to aqueous potassium hydroxide (0.9 g., 85% assay, 0.014 mole in 5 ml.). Light yellow, powdery potassium dinitromethane precipitated immediately and was filtered and washed with methanol and ether. Yield: 0.68 g. (47%). When heated in a capillary tube the product exploded at 210°. Various samples of potassium dinitromethane decomposed explosively between 204 and 210°. Four milliliters of water were required to dissolve 0.10 g. When recrystallized from water, the product was obtained as pale yellow prisms, exploding at 210°.

*Analysis.*—Calcd. for $CHO_4N_2K$: K, 27.13. Found: K, 26.9, 26.5.

The ultraviolet spectrograms (Beckmann model DU quartz spectrophotometer) of aqueous solutions ($10^{-4}$, $4 \times 10^{-5}$ molar) of potassium dinitromethane show maximum absorption at 361 mu, log $E$ max. 4.32; a minimum at 290 mu, log $E$ min. 3.00; and a band at 247 mu, log $E$ max. 3.63. Corresponding data calculated from the ultraviolet spectrogram of potassium dinitromethane are: an absorption maximum at 27,700 cm.$^{-1}$ (361 mu), log $E$ max. 4.35; a minimum at 290 mu, log $E$ min. 2.97, and a band peak at 247 mu, log $E$ max. 3.60.

Silver dinitromethane was prepared from aqueous silver nitrate (0.34 g., 0.002 mole in 1 ml.) and potassium dinitromethane (0.14 g., 0.001 mole in 4–5 ml.). The yellow (or yellow-green) salt (0.20 g., theoretical, 0.21 g.) was washed with methanol and ether. The decomposition point of this product varied with the preparation: darkening occurred from 100 to 130°, decomposition with gassing at 133°; or explosive decomposition at 117, 120°. Silver dinitromethane is reported to explode at 135°. Silver dinitromethane is photosensitive and in twenty-four hours it decomposed extensively.

*Analysis.*—Calcd. for $CHO_4N_2Ag$: Ag, 50.67. Found: 50.1, 50.3.

(2) A portion (1.50 g.) of the crude nitration product that had been stored in ether was dissolved in 50 percent aqueous methanol (10 ml.) and added to aqueous potassium hydroxide (1.4 g. in 5 ml.) at 0°. The potassium dinitromethane which formed (0.90 g., 50% over-all yield from 1-nitro-2-propanol) was identified by (1) explosive decomposition at 207, 210°; (2) when heated for one hour at 56° (2–3 mm.) a sample weighing 0.1172 g. lost 0.0006 g. (0.5%); a sample weighing 0.1092 g. heated for one hour at 92–95° in a drying oven lost 3 percent of its weight (no further decrease after an additional one and one-half hours at 90°); (3) the decomposition point, after heating, was 210°. Potassium 1,1-dinitro-2-propanol loses one mole of acetaldehyde (30.6% of its weight) on being heated at 90–95° and explodes at 205°. The silver derivative (yellow-green leaves; photosensitive), prepared as before, explodes at 120°.

*Analysis.*—Calcd. for $CHO_4N_2Ag$: Ag, 50.67. Found: Ag. 50.7, 50.7.

After potassium dinitromethane had been isolated, the filtrate deposited a yellow salt. Precipitation of this second crop of crystals was complete on addition of alcohol. A minute after the solid had been collected and washed with methanol and ether, it suddenly decomposed, leaving no residue.

(d) *Cleavage of 1,1-dinitro-2-propanol to acetaldehyde.*—A solution of the crude product (0.50 g., 0.0033 mole based on 1,1-dinitro-2-propanol) in methanol (5 ml.) was treated with a solution of 2,4-dinitrophenylhydrazine (0.70 g., 0.0035 mole) in 2 N hydrochloric acid. Precipitation of a yellow solid, needles, began after a few minutes. After three days, 0.45 g. (61%) of acetaldehyde 2-4-dinitrophenylhydrazone was obtained, M.P. 143–146°. After several recrystallizations from ethanol-water and from chloroform-ethanol, the derivative melts at 155–156°. The X-ray diffraction pattern was identical with a sample of 2,4-dinitrophenylhydrazone separately obtained.

Potassium dinitromethane, prepared from the crude nitration product, did not yield a solid derivative on being treated with a solution of 2,4-dinitrophenylhydrazine in 2 N hydrochloric acid. From these data it is concluded that the crude product from oxidative nitration is principally 1,1-dinitro-2-propanol (50% yield, as determined by conversion into potassium dinitromethane; 61% by the determination of acetaldehyde as the 2,4-dinitrophenylhydrazone).

EXAMPLE XIII

*Preparation of potassium dinitromethane from nitromethane*

Nitromethane (0.61 g., 0.01 mole) was dissolved slowly in aqueous sodium hydroxide (0.41 g., 0.01 mole) at 0–5°. After sodium nitrite (0.75 g., 97% assay, 0.011 mole) had been added, the solution was poured into a mixture of aqueous silver nitrate (3.41 g., 0.02 mole in 50 ml.) and ether (25 ml.) at 0°. A white solid formed which rapidly turned black. Twenty minutes later, the black deposit was filtered and washed with ether. The ethereal extracts were washed with a small volume of water and then slowly added to a stirred solution of aqueous potassium hydroxide (1.0 g. in 10 ml.). The ether layer lost its color, the alkaline layer became deep red, and pale yellow crystals of potassium dinitromethane separated (0.05 g., 3%); the crystals explode at 210°. The filtrate was diluted with alcohol and cooled for twenty-four hours; however no additional precipitate was obtained.

EXAMPLE XIV

*Preparation of 2,2,4,4-tetranitropentane*

2,2,4-trinitropentane (4.14 g., 0.02 mole) dissolved in ether (25 ml.) was added dropwise to a solution of sodium hydroxide (0.90 g., 0.022 mole) in methanol (20 ml.) and ether (20 ml.) at 0°. After the addition was completed, the reddish cloudy suspension was stirred for fifteen minutes. Ether (ca. 50 ml.) and water (ca. 25 ml.) were then added until a clear aqueous layer was obtained. Sodium nitrate (1.5 g., 0.02 mole, 97% assay) was dissolved in the mixture; aqueous silver nitrate (6.8 g., 0.04 mole in 30 ml.) was then poured with stirring into the mixture. After one hour at 0–20° the silver deposit was collected, washed liberally with ether and with hot benzene (3 x 15 ml.). After the organic layer in the filtrate had been separated, washed with brine, and evaporated in vacuum, a yellow crystalline solid was obtained. The solid was filtered, using petroleum ether as the wash liquid. The product, crude 2,2,4,4-tetranitropentane (4.00 g., 80% of 5.04 g. theoret.), melted at 83–85°;

after two recrystallizations from benzene-petroleum ether, white crystals were obtained, M.P. 86.5–87°, 87–87.5°.

*Analysis.*—Calcd. for $C_5H_8O_8N_4$: C, 23.82; H, 3.20; N, 22.22. Found: C, 23.95, 24.01; H, 3.18, 3.08; N, 22.39, 22.40.

EXAMPLE XV

*Oxidation with mercuric ion—Preparation of 2,2-dinitropropane*

Aqueous mercuric nitrate hemihydrate (17.0 g., 0.05 mole in 25 ml. water) was added rapidly to a stirred solution of 2-nitropropane (4.45 g., 0.05 mole), sodium hydroxide (2.25 g.), sodium nitrite (3.75 g., 97% assay) and water (25 ml.). After one-half hour the mixture was heated to its boiling point (a blue condensate of propyl pseudonitrole formed on the condenser) and allowed to cool. The mixture was extracted with ether and filtered. The ether layer from the filtrate was washed with saturated sodium chloride solution and then distilled, leaving an oily blue residue. The crude residue was dissolved in boiling petroleum ether (60–65°) and then crystallized to yield a low melting, waxy solid (2.3 g., pale blue in color). After being triturated with hot thirty percent hydrogen peroxide for a few minutes, the solid was recrystallized from petroleum ether, yielding 2,2-dinitropropane (1.70 g., 25%), M.P. 52–53°. The melting point of the product was not altered by admixture with an authentic sample of 2,2-dinitropropane.

EXAMPLE XVI

*Reaction of sodium 2-nitropropane and nitric oxide— Preparation of 2,2-dinitropropane*

(1) *Formation of a mixed salt (1:1) of sodium 2-nitropropane and sodium nitrite.*—Nitric oxide (approx. 1 mole) was passed into a stirred solution of 2-nitropropane (22.3 g., 0.25 mole), absolute ethanol (350 ml.) and sodium ethylate (0.3 mole) for three hours at 0–10°. (Before nitric oxide was added, the reaction mixture was flushed with nitrogen.) After the introduction of nitric oxide was completed, the mixture was flushed with nitrogen. The insoluble product, a mixture of sodium 2-nitropropane and sodium nitrite, was filtered, washed with alcohol and ether, and dried to constant weight in vacuum over calcium chloride. Yield: 21.2 g. (94%, based on a 1:1 mixture of sodium 2-nitropropane and sodium nitrite).

*Analysis.*—Calcd. for the double salt of sodium 2-nitropropane and sodium nitrite, $C_3H_6O_4N_2Na_2$: C, 20.00; H, 3.36; N, 15.56; Na, 25.54. Found: C, 16.8; H, 2.65; N, 14.9; Na, 26.6.

The main contaminant in the crude product was sodium nitrite. On the basis of analytical data, the product contains 83.7 percent of the double salt and 16.3 percent of sodium nitrite.

(2) *Oxidation by silver ion—2,2-dinitropropane.*—An aqueous solution of the double salt of sodium 2-nitropropane and sodium nitrite (2.0 g., 0.011 mole in 20 ml.) was gradually added to a stirred solution of silver nitrate (4.0 g., 0.0235 mole in 25 ml.). Silver was deposited almost instantly. When addition of reagent was complete, the mixture was distilled into 10 percent alkali. Crude 2,2-dinitropropane (1.0–1.1 g., 70–73%), M.P. 47–49°, was isolated from the cooled distillate by filtration or by extraction with ether and evaporating the dried ether extract. After recrystallization from petroleum ether the product melted at 53–53.5°. The melting point of the product was not depressed by the addition of an authentic sample of 2,2-dinitropropane.

EXAMPLE XVII

*Reaction of sodium 2-nitrobutane and nitric oxide— Preparation of 2,2-dinitrobutane*

(1) *Formation of a mixed salt (1:1) of sodium 2-nitrobutane and sodium nitrite.*—A solution of sodium 2-nitrobutane in absolute alcohol was prepared by adding 2-nitrobutane (25.8 g., 0.25 mole) to ethyl alcohol (350 ml.) containing sodium (7.0 g., 0.3 g. atom). The mixture was cooled to 0°, stirred, flushed with nitrogen and then treated with nitric oxide (approx. 1 mole) for 100 minutes. The precipitated salt was collected, washed with alcohol and ether, and dried to constant weight in vacuum. Yield: 22.0 g. (91% based on a 1:1 mixture of sodium 2-nitrobutane and sodium nitrite).

*Analysis.*—Calcd. for the double salt of sodium 2-nitrobutane and sodium nitrite, $C_4H_8O_4N_2Na_2$: C, 24.74; H, 4.15; N, 14.43; Na, 23.70. Found: C, 25.31, 25.53; H, 4.21, 4.17; N, 13.44, 13.72; Na, 23.92, 24.13.

(2) *Oxidation by silver ion—2,2-dinitrobutane.*—An aqueous solution of the product derived from sodium 2-nitrobutane and nitric oxide (10.0 g., 0.052 mole in 25 ml.) was added to aqueous silver nitrate (12.0 g., 0.071 mole in 25 ml.). The mixture was continuously extracted with ether for six hours. Distillation of the extract yielded a yellow liquid (4.0 g., 79%), B.P. 190–198° with slight decomposition at 745 mm., $n_D^{20}$ 1.4346.

The product was redistilled at reduced pressure to yield a colorless liquid, B.P. 78–80° (9–10 mm), $n_D^{20}$ 1.4353, $d_4^{20}$ 1.212; $M_D$ calcd. 31.92, $M_D$ found 31.90. A small forerun, $n_D^{20}$ 1.4290, was discarded. Calculation of yield is based on moles of silver nitrate used; the stoichiometric ratio for the complete reaction is two moles of silver ion to one of the double salt of sodium 2-nitrobutane and sodium nitrite.

EXAMPLE XVIII

*Reaction of sodium nitrocyclohexane and nitric oxide— Preparation of 1,1-dinitrocyclohexane*

(1) *Formation of a mixed salt (1:1) of sodium nitrocyclohexane and sodium nitrite, cyclohexanone, cyclohexanone oxime, and 1,1'-dinitro-bicyclohexyl.*—Nitric oxide (approx. 1 mole) was passed into a stirred mixture (prepared under nitrogen) of nitrocyclohexane (25.8 g., 0.20 mole) and sodium ethylate (0.22 mole) in absolute ethanol (400 ml.) for three hours at 0–10°. The mixture, after being flushed with nitrogen and filtered, yielded the double salt of sodium nitrocyclohexane and sodium nitrite (15 g., 68%) as a light tan powder.

*Analysis.*—Calcd. for $C_6H_{10}O_4N_2Na_2$: C, 32.73; H, 4.58; N, 12.73; Na, 20.89. Found: C, 25.54, 25.59; H, 3.78, 3.49; N, 10.81, 10.91; Na, 20.84, 20.54; volatile solvents, 12.6.

The ratio of percent carbon found to the calculated value is 0.781; 78.1 percent of the calculated value for hydrogen is 3.58; the experimentally determined analytical values for hydrogen are 3.78, 3.49. On this basis, the purity of the dried double salt is 78 percent.

The filtrate was saturated with carbon dioxide until precipitation of carbonates no longer occurred, then filtered, and distilled at atmospheric pressure to one-third of its original volume. The distillate, ethanol, was discarded. Distillation of the product was continued at 40° (40 mm.). The high boiling residue was triturated with ether, filtered free of inorganic salts and recombined with the distillate. Rectification of the product through a short column yielded the following:

(1) Cyclohexanone (3.5 g., 17.8%), B.P. 54–57° (20 mm.), $n_D^{20}$ 1.4487. (2) Cyclohexanone and cyclohexanone oxime (0.7 g., 3.1–3.6%), B.P. 57–97° (20 mm.), $n_D^{20}$ 1.4514. (3) Cyclohexanone oxime (1.5 g., 6.6%), B.P. 109–111° (20 mm.). The oxime solidified in the condenser and receiver, and was recrystallized from petroleum ether, (1.3 g.) M.P. 89–89.5°. (4) 1,1'-dinitrobicyclohexyl (0.81 g., 3.1%, from the concentrated hot methanolic extract of the undistillable residue); recrystallized from methanol-acetone, M.P. 214° (darkening) —220° (decomposition). (5) Residue (7.4%), undistillable and uncrystallizable. Oximes prepared from fractions (1) and (2), M.P. 89–90°, did not depress the melting point of fraction (3) nor that of an authentic sample of cyclohexanone oxime. Fraction (4) did not depress the melting point of an authentic sample of 1,1'-dinitrobicyclohexyl, M.P. 214–220°. Nitrocyclohexane was not detected in any of the fractions.

(2) *Oxidation by silver ion—1,1-dinitrocyclohexane.*— A solution of the product derived from sodium nitrocyclohexane and nitric oxide (10.0 g., 0.045 mole) in water (50 ml.) was gradually added to a stirred solution of aqueous silver nitrate (15.0 g., 0.088 mole in 50 ml.) at 0–5°. The mixture was distilled to half-volume; silver nitrate solution (4.0 g., in 50 ml.) was again added and distillation was continued till oil droplets ceased co-distilling with water. The yellow two-phase distillate was extracted with ether. Distillation of the dried ether extract gave crude 1,1-dinitrocyclohexane (5.2 g.), M.P. ca. 0–10°, B.P. 120–125° (35 mm.), $n_D^{20}$ 1.4690–1.4744. On standing at 0–5° for twenty-four hours, the crude product partially solidified. The liquid phase was pipetted and distilled (fractions (1), (2)); the solid phase melted on warming, $n_D^{20}$ 1.4727, and was also distilled (fraction (3)). Total: 4.7 g. (60%) of colorless product. (1) B.P. 69–71° (1–1.5 mm.), $n_D^{20}$ 1.4742, (2) B.P. 80–83° (2 mm.), $n_D^{20}$ 1.4742, (3) B.P. 82–83° (2 mm.), $n_D^{20}$ 1.4742. Each fraction solidified, on cooling, to a white waxy solid, M.P. >20°; therefore, the samples used for measurement of the refractive indices must have been supercooled. A portion of the product was redistilled, B.P. 67.5–68° (0.75 mm.), M.P. 33–35°; recrystallized from petroleum ether, M.P. 35.5–36°. A second portion was recrystallized twice from petroleum ether, M.P. 35.5–36°. 1,1-dinitrocyclohexane is reported as a yellow liquid, B.P. 142–143° (35 mm.), $n_D^{21}$ 1.4732, $d_4^{21}$ 1.2452.

The melting point of a mixture of the sample with 1,1-dinitrocyclohexane which had been prepared by the oxidation of sodium nitrocyclohexane and sodium nitrite with silver ion was not depressed, M.P. 35.5–36°.

It is to be understood, of course, that the above examples are illustrative only, and that the inventions disclosed and claimed are not to be construed as limited to the particular materials or procedures set forth. Numerous modifications of procedure and many other polynitrated compounds naturally will occur to those skilled in the art, and the inventions disclosed and claimed include any such modifications or the use of obvious equivalents. Various changes may therefore be made in the embodiments illustrating the invention without departing from the spirit and scope of our invention.

We claim:

1. A process for the formation of gem polynitro compounds which comprises the bringing together in alkaline solution of (*a*) a salt forming organic nitro compound having a structural formula of where R and R' each represent a substituent selected from the group consisting of hydrogen, lower alkyl, lower hydroxy alkyl, lower nitro alkyl, fluorenyl, and phenyl, (*b*) nitrite ions, and (*c*) metallic ions selected from the group consisting of silver ions and mercuric ions.

2. A process for the formation of gem polynitro compounds which comprises the bringing together in alkaline solution of (*a*) a salt forming organic nitro compound having a structural formula of:

where R and R' each represent a substituent selected from the group consisting of hydrogen, lower alkyl, lower hydroxy alkyl, lower nitro alkyl, fluorenyl, and phenyl, (*b*) nitrite ions, and (*c*) silver ions.

3. A process for the formation of gem polynitro compounds which comprises the bringing together in alkaline solution of (*a*) a salt forming organic nitro compound having a structural formula of where R and R' each represent a substituent selected from the group consisting of hydrogen, lower alkyl, lower hydroxy alkyl, lower nitro alkyl, fluorenyl, and phenyl, (*b*) nitrite ions and (*c*) mercuric ions.

4. A process for the formation of gem dinitro compounds which comprises the bringing together in non-acidic solution of (*a*) a salt of an organic mononitro compound having a structural formula of where R and R' each represent a substituent selected from the group consisting of hydrogen, lower alkyl, lower hydroxy alkyl, lower nitro alkyl, fluorenyl, and phenyl, (*b*) a material which in solution yields nitrite ions and (*c*) a material which in solution yields silver ions.

5. A process for the formation of gem polynitro compounds which comprises the bringing together in alkaline solution of (*a*) a primary nitro organic compound having a structural formula of where R represents a substituent selected from the group consisting of lower alkyl, lower hydroxy alkyl, lower nitro alkyl, fluorenyl, and phenyl, (*b*) a material which in solution yields nitrite ions, and (*c*) a material which in solution yields silver ions.

6. A process for the formation of gem polynitro compounds which comprises the bringing together in alkaline solution of (*a*) a secondary nitro organic compound having a structural formula of where R and R' each represent a substituent selected from the group consisting of lower alkyl, lower hydroxy alkyl, lower nitro alkyl, fluorenyl, and phenyl, (*b*) a material which in solution yields nitrite ions, and (*c*) a material which in solution yields silver ions.

7. A process for the formation of gem polynitro compounds which comprises the bringing together in non-acidic solution of (*a*) a salt of an organic nitro compound having a structural formula of where R and R' each represent a substituent selected from the group consisting of hydrogen, lower alkyl, lower hydroxy alkyl, lower nitro alkyl, fluorenyl, and phenyl, (*b*) a material which in solution yields nitrite ions, and (*c*) a material which in solution yields silver ions.

8. A process for the formation of gem polynitro compounds which comprises the steps of first forming a salt of an organic nitro compound having a structural formula of where R and R' each represent a substituent selected from the group consisting of hydrogen, lower alkyl, lower hydroxy alkyl, lower nitro alkyl, fluorenyl, and phenyl, and second bringing together in non-acidic solution of (a) said salt, (b) a material which in solution yields nitrite ions, and (c) a material which in solution yields silver ions.

9. A process for the formation of gem polynitro compounds which comprises the bringing together in non-acidic solution of (a) a salt of an organic nitro compound having a structural formula of where R and R' each represent a substituent selected from the group consisting of hydrogen, lower alkyl, lower hydroxy alkyl, lower nitro alkyl, fluorenyl, and phenyl, (b) nitrite ions, and (c) metallic ions selected from the group consisting of silver ions and mercuric ions.

10. A process for the formation of polynitroalcohols which comprises the bringing together in non-acidic solution of (a) a salt forming-nitroalcohol having at least one replaceable hydrogen attached to a carbon atom bearing a nitro group, and having a structural formula of where R represents a substituent selected from the group consisting of hydrogen, lower alkyl, lower hydroxy alkyl, lower nitro alkyl, fluorenyl, and phenyl, and R'' represents a hydroxy alkyl, (b) a base, (c) nitrite ions, and (d) silver ions.

11. A process according to claim 2 in which the salt forming organic nitro compound is 2-nitro-1-propanol.

12. A process according to claim 2 in which the salt forming organic nitro compound is phenylnitromethane.

13. A process according to claim 2 in which the salt forming organic nitro compound is nitroethane.

14. A process according to claim 2 in which the salt forming organic nitro compound is 2-nitro-propane.

15. A process according to claim 2 in which the salt forming organic nitro compound is 2-nitro-1,3-propanediol.

16. A process according to claim 2 where R represents a lower alkyl and R' represents a lower hydroxy alkyl.

17. A process according to claim 2 where R and R' each represent a lower hydroxy alkyl.

18. A process according to claim 2 where R represents hydrogen and R' represents a lower alkyl.

19. A process according to claim 7 where R represents a lower alkyl and R' represents a lower hydroxy alkyl.

20. A process according to claim 7 where R represents hydrogen and R' represents a lower alkyl.

21. A process according to claim 7 where R and R' each represent a lower hydroxy alkyl.

22. A process according to claim 9 where the salt is an alkali salt of 2-nitro-1-propanol, and the metallic ions are silver ions.

23. A process according to claim 9 where the salt is an alkali salt of phenylnitromethane and the metallic ions are silver ions.

24. A process according to claim 9 where the salt is an alkali salt of nitroethane and the metallic ions are silver ions.

25. A process according to claim 9 where the salt is an alkali salt of 2-nitropropane and the metallic ions are silver ions.

26. A process according to claim 9 where the salt is an alkali salt of 2-nitro-1,3-propanediol and the metallic ions are silver ions.

References Cited in the file of this patent

UNITED STATES PATENTS

| | | |
|---|---|---|
| 2,139,121 | Hass et al. | Dec. 6, 1938 |
| 2,387,279 | McCracken et al. | Oct. 23, 1945 |
| 2,538,298 | Denton et al. | Jan. 16, 1951 |

OTHER REFERENCES

Meer: Ann. 181, pp. 1–23 (1876), (p. 5 relied on.).

UNITED STATES PATENT OFFICE
CERTIFICATE OF CORRECTION

Patent No. 2,997,504                                  August 22, 1961

Harold Shechter et al.

It is hereby certified that error appears in the above numbered patent requiring correction and that the said Letters Patent should read as corrected below.

Column 3, line 65, for that portion of the formula reading "$C_2H-OH$" read -- $C_2H_5OH$ --; column 8, line 18, for "nitrate" read -- nitrite --; column 11, line 4, for "disagreeabdle" read -- disagreeable --; column 12, line 19, for "2-4-dinitrophenylhydrazone" read -- 2,4-dinitrophenylhydrazone --; line 65, for "nitrate" read -- nitrite --; column 16, lines 25 and 26, for "compuonds" read -- compounds --.

Signed and sealed this 23rd day of January 1962.

(SEAL)
Attest:

ERNEST W. SWIDER  
Attesting Officer

DAVID L. LADD  
Commissioner of Patents